(12) United States Patent
Tani

(10) Patent No.: US 6,865,095 B2
(45) Date of Patent: Mar. 8, 2005

(54) POWER CIRCUIT (75) Inventor: Katsuhiko Tani, Takefu (JP)

(73) Assignee: Orion Electric Company, Ltd., Fukui-ken (JP)

( * ) Notice: Subject to any disclaimer, the term of this patent is extended or adjusted under 35 U.S.C. 154(b) by 3 days.

(21) Appl. No.: 10/671,476

(22) Filed: Sep. 29, 2003

(65) Prior Publication Data
US 2004/0095783 A1 May 20, 2004

(30) Foreign Application Priority Data
Sep. 27, 2002 (JP) ........................................ 2002-282662

(51) Int. Cl.⁷ ............................. H02H 9/08; H02H 7/122
(52) U.S. Cl. ........................................................ 363/56.1
(58) Field of Search ...................... 361/93.9; 363/21.04, 363/56.1, 21.09, 21.08

(56) References Cited

U.S. PATENT DOCUMENTS 4,744,020 A * 5/1988 Cavagnolo ................ 363/21.16

FOREIGN PATENT DOCUMENTS

| JP | 5-18291 | 8/1991 |
|----|---------|--------|
| JP | 06-022537 | 7/1992 |
| JP | 06-054534 | 7/1992 |
| JP | 06-090559 | 9/1992 |
| JP | 07-227083 | 2/1994 |
| JP | 08-168243 | 12/1994 |
| JP | 08-289544 | 4/1995 |
| JP | 11-098838 | 9/1997 |
| JP | 11-164551 | 11/1997 |

* cited by examiner

Primary Examiner—Shawn Riley
(74) Attorney, Agent, or Firm—Reed Smith LLP; Stanley P. Fisher, Esq.; Juan Carlos A. Marquez, Esq.

(57) ABSTRACT

It is an object to provide a power circuit in which a space for providing a circuit to protect the power circuit can be reduced when a short circuit is generated on the secondary side of the transformer of the power circuit, and the size of the circuit can be decreased. A first coil (L1), a second coil (L2) and a third coil (L3) are provided on the primary side of a transformer (25) disposed on a power circuit (35). Moreover, a plurality of coils corresponding to the coils on the primary side is provided on the secondary side of the transformer (25). Furthermore, the primary side of the power circuit (35) is provided with a power switching unit (1) for controlling the input of a power to the transformer (25), a first integrating circuit (31) for integrating the voltage of the second coil (L2) and a second integrating circuit (32) for integrating the voltage of the third coil, and abnormality detecting means (13) for detecting the abnormality of the state of a voltage between the second coil (L2) and the third coil (L3) based on the output of the first integrating circuit (31) and that of the second integrating circuit (32). When the abnormality detecting means (13) detects the abnormality of the state of the voltage, the power switching unit (1) is brought into a non-conduction state so that the input of the power to the transformer (25) is stopped.

13 Claims, 5 Drawing Sheets

POWER CIRCUIT

BACKGROUND OF THE INVENTION

1. Field of the Invention

The present invention relates to a power circuit comprising a transformer.

2. Description of the Related Art

A power circuit comprising a transformer supplies a power fed to a primary side of the transformer to a secondary side in accordance with the winding ratio of a coil on the primary side to a coil on the secondary side, and supplies a power to a load of an electric apparatus or the like which is connected to the secondary side.

The power circuit is provided with a circuit for detecting a short circuit generated in a coil or another circuit on the secondary side of the transformer if any and stopping the supply of the power to the primary side of the transformer, thereby protecting a power source.

The circuit for protecting a power source has been disclosed in Japanese Laid-Open Patent Publication No. Hei 7-227083, for example. In the protecting circuit disclosed in the publication, a light receiving unit of a photocoupler is provided on the primary side of the transformer and a light emitting unit of the photocoupler is provided on the secondary side of the transformer.

When the short circuit is generated on the secondary side of the transformer, the light emitting unit of the photocoupler emits a light. When the light receiving unit of the photocoupler provided on the primary side of the transformer receives the light emitted from the light emitting unit, the supply of the power to the primary side of the transformer is stopped.

In the case in which the short circuit is generated on the secondary side of the transformer, consequently, the supply of the power can be stopped to prevent a semiconductor device or the like constituting the power circuit from being damaged.

According to the circuit disclosed in the Japanese Laid-Open Patent Publication No. Hei 7-227083, however, the light receiving unit is to be provided on the primary side of the transformer and the light emitting unit is to be provided on the secondary side of the transformer as described above.

Accordingly, a circuit element for protecting the power source is to be provided on both the primary and secondary sides of the transformer and a large space is required so that the size of the power circuit cannot be reduced.

SUMMARY OF THE INVENTION

Therefore, it is an object of the present invention to provide a power circuit in which a space for providing a circuit to protect the power circuit can be reduced and the same circuit can be small-sized, and a size can be thus decreased.

In order to attain the object, the present invention provides a power circuit comprising a transformer, wherein a first coil, a second coil and a third coil are provided on a primary side of the transformer, a pulse voltage is applied to the first coil from a power source for outputting a power based on the pulse voltage, each of the second and third coils has one of terminals grounded in common and directions in which the coils are to be wound toward the other terminals are opposite to each other and the numbers of winds of the second and third coils are different from each other, a plurality of coils corresponding to the first, second and third coils on the primary side are provided on a secondary side of the transformer, the primary side of the transformer is provided with a power switching unit connected in series to the first coil and serving to control an input of a power to the transformer, a first integrating circuit for integrating a voltage output through a diode connected to the other terminal of the second coil in a forward direction, a second integrating circuit for integrating a voltage output through a diode connected to the other terminal of the third coil in a forward direction, and abnormality detecting means for detecting an abnormality of a state of a voltage between the second coil and the third coil based on an output of the first integrating circuit, an output of the second integrating circuit and a predetermined set value, a pulse voltage is applied to the first coil so that a power is input to the transformer when the power switching unit is brought into a conduction state, and the power switching unit is brought into a non-conduction state so that the input of the power to the transformer is stopped when the abnormality detecting means detects the abnormality of the state of the voltage between the second coil and the third coil.

According to the power circuit of the present invention, a voltage having a phase difference of 180 degrees between voltages to be induced to the second and third coils provided on the primary side of the transformer is generated thereon.

The numbers of winds of the second and third coils are different from each other. Therefore, the voltage to be induced to one of the coils has a greater peak value than that of the voltage to be induced to the other coil.

In the case in which the power circuit according to the present invention is normally operated, a state in which a predetermined voltage difference is made is brought between the second and third coils on the primary side of the transformer.

When a short circuit is generated on the secondary side of the transformer, a fluctuation is generated on the state of the voltage between the second and third coils on the primary side which are magnetically coupled to the secondary side of the transformer and are thus operated. Consequently, the state of the voltage between the second and third coils causes an abnormality.

The abnormality of the state of the voltage between the second and third coils is detected by the abnormality detecting means. The abnormality detecting means detects the abnormality of the state of the voltage between the second and third coils based on an integral value obtained by the first integrating circuit and an integral value obtained by the second integrating circuit.

When the abnormality detecting means detects an abnormality, the power switching unit is brought into a non-conduction state so that a current cannot flow to the first coil of the transformer to which the power switching unit is connected. Consequently, the input of the power to the transformer is stopped. Thus, the supply of the power to the secondary side of the transformer is also stopped.

According to the power circuit of the present invention, means for protecting the power circuit, that is, means for detecting a short circuit on the secondary side of the transformer to stop the supply of the power to the secondary side is provided on the primary side of the transformer and is not provided on the secondary side of the transformer.

Consequently, the size of the power circuit can be decreased and a space for providing the power circuit can be reduced. Moreover, an electric apparatus can easily be connected to the power circuit and the power circuit can readily be handled.

In the power circuit, furthermore, a first switching unit for controlling an operation of the power switching unit is provided on the primary side of the transformer, the power switching unit has an input terminal for inputting a current and an output terminal for outputting the current which are connected in series to the first coil, and a control terminal for controlling a conduction state and a non-conduction state which is connected to input a control voltage from the other terminal of the second coil and is connected to a ground through the first switching unit, and the first switching unit is brought into the conduction state when the abnormality detecting means detects the abnormality, the control terminal of the power switching unit is grounded by the first switching unit set in the conduction state, and the power switching unit is thus brought into the non-conduction state.

According to the power circuit of the present invention, when the abnormality detecting means detects an abnormality, the first switching unit is brought into the conduction state so that the power switching unit can be brought into the non-conduction state.

Consequently, the operation of the power switching unit can be controlled by the ON/OFF operation of the first switching unit. Thus, it is possible to reduce the size of a circuit for controlling the power switching unit based on the detection of the abnormality by the abnormality detecting means.

In the power circuit provided with the first switching unit, moreover, a Zener diode is provided as the abnormality detecting means, the Zener diode is conducted in an opposite direction when an abnormality is generated on the state of the voltage between the second coil and the third coil, and the Zener diode conducted in the opposite direction outputs a voltage, thereby bringing the first switching unit into the conduction state.

According to the power circuit of the present invention, the abnormality detecting means is constituted by the Zener diode. Therefore, the abnormality can be detected by a simple circuit. Consequently, the size of the power circuit can be reduced and a manufacturing cost can also be cut down.

In the power circuit provided with the Zener diode as the abnormality detecting means, moreover, the primary side of the transformer is provided with a second switching unit for controlling the conduction state of the first switching unit, the second switching unit is connected to be brought into the conduction state when the Zener diode detects the abnormality of the state of the voltage between the second coil and the third coil, thereby outputting a voltage, and the first switching unit is brought into the conduction state by the second switching unit set in the conduction state.

According to the power circuit of the present invention, when the abnormality detecting means detects an abnormality, the second switching unit is brought into the conduction state so that the first switching unit can be brought into the conduction state and the power switching unit can be brought into the non-conduction state.

Consequently, it is possible to control the operation of the first switching unit by the ON/OFF operation of the second switching unit based on the output of the voltage from the Zener diode. Thus, it is possible to simply constitute a circuit for controlling the first switching unit based on the operation of the Zener diode.

Moreover, it is possible to constitute the first switching unit by a transistor. Consequently, a circuit for connecting the first switching unit to control the output of the power switching unit can be simplified and the manufacturing cost of the power circuit can also be cut down.

Furthermore, it is possible to constitute the second switching unit by a transistor. Consequently, a circuit for connecting the second switching unit to control the conduction state of the first switching unit can be simplified and the manufacturing cost of the power circuit can be cut down.

DESCRIPTION OF THE PREFERRED EMBODIMENTS

Figure 1:
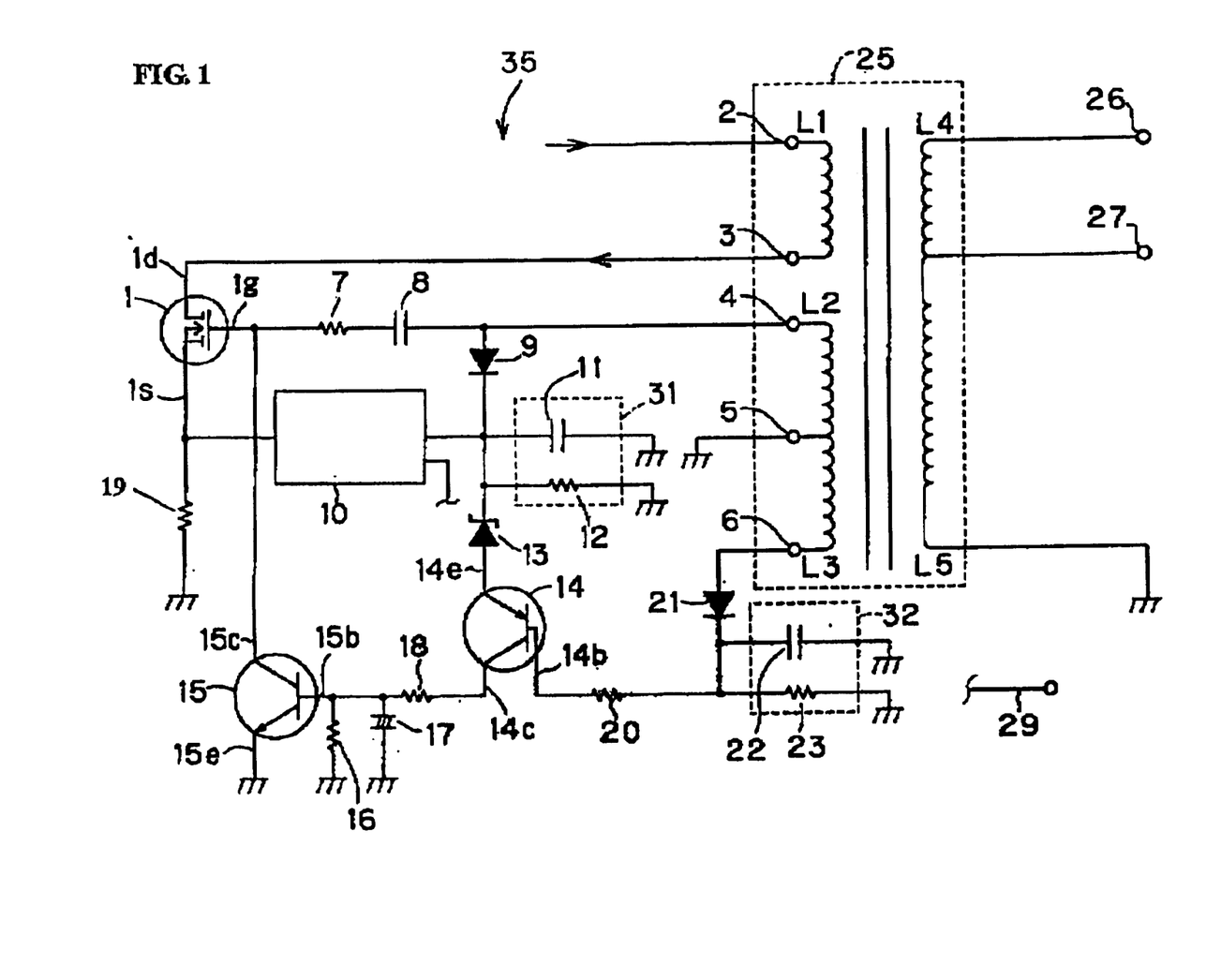
FIG. 1 is a circuit diagram showing a power circuit according to an embodiment of the present invention.

An embodiment of the present invention will be described with reference to the drawings. FIG. 1 is a circuit diagram showing a power circuit 35 according to the embodiment of the present invention. The power circuit 35 comprises a transformer 25, a power FET (a power field effect transistor) 1, a feedback circuit 10, a first transistor 15, a second transistor 14, a first integrating circuit 31, a second integrating circuit 32, and a Zener diode 13.

The transformer 25 is provided with a first coil L1, a second coil L2 and a third coil L3 on a primary side. Moreover, the transformer 25 is provided with a fourth coil L4 and a fifth coil L5 on a secondary side.

In the transformer 25, when a voltage is applied to the first coil L1, a voltage in accordance with the relationship among the numbers of winds of the first coil L1, the fourth coil L4 and the fifth coil L5 is induced to the fourth coil L4 and the fifth coil L5. Moreover, a voltage in accordance with the relationship among the numbers of winds of the coil L2, the coil L3 and the coil L5 is induced to the second coil L2 and the third coil L3 in the transformer 25.

In the transformer 25, a voltage in accordance with the relationship between the numbers of winds of the fourth coil L4 and the first coil L1 is induced to the fourth coil L4 for a voltage to be applied to the first coil L1 when the power FET 1 to be described below is set in an operation state and a power can be transmitted between the primary side and the secondary side.

In the transformer 25, moreover, a voltage in accordance with the relationship among the numbers of winds of the second coil L2, the third coil L3 and the fifth coil L5 is induced to the second coil L2 and the third coil L3 for a voltage to be induced to the fifth coil L5 when a power can be transmitted between the primary side and the secondary side.

The first coil L1 is connected to a power source which is not shown. By the power source, a pulse voltage is applied to the first coil L1. The second coil L2 and the third coil L3 use a terminal 5 thereof in common, and the terminal 5 is grounded. The second coil L2 and the third coil L3 are formed in such a manner that coil winding directions are opposite to each other.

More specifically, the second coil L2 and the third coil L3 are formed in such a manner that a direction in which the coil is to be wound from the terminal 5 of the second coil L2 toward a terminal 4 is opposite to a direction in which the coil is to be wound from the terminal 5 of the third coil L3 toward a terminal 6. Consequently, a phase difference of 180 degrees is made between a pulse voltage induced to the second coil L2 and a pulse voltage induced to the third coil L3.

Moreover, the number of winds N2 of the second coil L2 is set to be greater than that of winds N3 of the third coil L3. In a state in which the transformer 25 is operated normally, consequently, the peak value of the pulse voltage induced to the second coil L2 is greater than that of the pulse voltage induced to the third coil L3.

The fourth coil L4 on the secondary side of the transformer 25 is provided for a high voltage. An output terminal 26 of the fourth coil L4 is used for a high voltage. The fifth coil L5 on the secondary side of the transformer 25 is provided for a low voltage. An output terminal 27 of the fifth coil L5 is used for a low voltage.

Electric apparatuses (not shown) are connected to the output terminals 26 and 27 on the secondary side of the transformer 25, and can be operated by a power output from the secondary side of the transformer 25.

The power FET 1 is connected between the first coil L1 and the second coil L2 on the primary side of the transformer 25. The power FET 1 is equivalent to a power switching unit for controlling the input of the power to the transformer 25.

Any of various semiconductor switching units which can input/output a large power is used for the power FET 1. The power FET 1 can apply a high voltage of approximately several hundreds V to each of terminals 1d, 1s and 1g which will be described below.

The power FET 1 includes a drain terminal 1d, a gate terminal 1g and a source terminal 1s. The drain terminal 1d is connected to an output terminal 3 of the first coil L1. The drain terminal 1d is equivalent to an input terminal for inputting a current from the first coil L1 in a state in which the power FET 1 is operated.

The source terminal 1s is grounded through a resistor 19. By the resistor 19, a constant voltage is given to the source terminal 1s in a state in which the power FET 1 is operated. Thus, an operation can be stabilized. The source terminal 1s is equivalent to an output terminal for outputting a current in a state in which the power FET 1 is operated.

The gate terminal 1g is equivalent to a control terminal to which a control voltage for controlling the operation of the power FET 1 is input. The gate terminal 1g of the power FET 1 is connected to a ground through the first transistor 15 which will be described below.

Moreover, the gate terminal 1g of the power FET 1 is connected to the terminal 4 of the second coil L2 through a resistor 7 and a capacitor 8 which are connected in series. By providing the resistor 7 and the capacitor 8, it is possible to prevent a starting current from flowing into the ground through the coil L2. Thus, a voltage pulse formed in the coil L2 can be input to the gate terminal 1g of the power FET 1 more reliably.

When a predetermined control voltage is input to the gate terminal 1g, the power FET 1 is brought into a conduction state. The drain terminal 1d and the source terminal 1s in the power FET 1 are brought into the conduction state. When a voltage is applied to the coil L1, consequently, a current output from the source terminal 1s through the drain terminal 1d by the coil L1 can be given.

If a current is given to the power FET 1 and the power FET 1 is operated, the transformer 25 can transmit a power between the coils L1 and L2 on the primary side and the coils L4 and L5 on the secondary side.

On the other hand, the power FET 1 is not brought into the conduction state if a control voltage is not input to the gate terminal 1g, and the drain terminal 1d and the source terminal 1s in the power FET 1 are not brought into the conduction state. Even if a voltage is applied to the coil L1, accordingly, a current cannot be given to the coil L1 and the power FET 1.

In a state in which the power FET 1 is brought into a non-conduction state and is not operated, consequently, the transformer 25 cannot transmit a power between the coils L1, L2, and L3 on the primary side and the coils L4 and L5 on the secondary side.

As shown in FIG. 1, the power circuit 35 is provided with the feedback circuit 10. The feedback circuit 10 serves to detect a reduced voltage or an overvoltage which is generated due to an overload or a light-load on the secondary side of the transformer 25, thereby feeding back the same voltage to the primary side of the transformer 25.

For the feedback circuit 10, it is possible to provide a well-known feedback circuit in a power circuit comprising a transformer which serves to detect a voltage on the secondary side of the transformer and to feed back the voltage to the primary side.

As shown in FIG. 1, the feedback circuit 10 has an output terminal connected to the source terminal 1s of the power FET 1. Moreover, the feedback circuit 10 has two input terminals.

One of the input terminals of the feedback circuit 10 is connected to a monitor terminal 29 for detecting a voltage on the secondary side of the transformer 25. Moreover, the other input terminal of the feedback circuit 10 is connected to the cathode side of a diode 9 and one of the terminals of each of a capacitor 11 and a resistor 12.

The first transistor 15 controls the operation of the power FET 1. More specifically, the first transistor 15 brings the power FET 1 into a conduction or non-conduction state depending on the conduction state thereof.

The first transistor 15 includes a base terminal 15b, an emitter terminal 15e and a collector terminal 15c. The base terminal 15b is connected through a resistor 18 to a collector terminal 14c of the second transistor 14 which will be described below.

Moreover, the base terminal 15b is connected to a ground through a resistor 16 and is connected to a ground through an electrolytic capacitor 17. By the resistor 16 and the electrolytic capacitor 17, the level of a voltage output from the second transistor 14 and input to the base terminal 15b can be stabilized.

The resistor 18 is a base resistor for the transistor 15. By a time constant based on the combination of the resistor 18 and the electrolytic capacitor 17, a timing for bringing the transistor 15 into the conduction state is adjusted.

The emitter terminal 15e of the first transistor 15 is connected to a ground. Moreover, the collector terminal 15c of the first transistor 15 is connected to the gate terminal 1g of the power FET 1.

When the second transistor 14 to be described below is brought into the conduction state and a voltage is output from the second transistor 14, the voltage is input as an operation signal for the first transistor 15 to the base terminal 15b so that the first transistor 15 is brought into the conduction state.

When the first transistor 15 is brought into the conduction state, the collector terminal 15c and the emitter terminal 15e in the first transistor 15 are brought into the conduction state. Consequently, the collector terminal 15c of the first transistor 15 is conducted to a ground. Thus, the control terminal 1g is grounded and a control voltage is not input so that the power FET 1 is brought into the non-conduction state.

On the other hand, in the case in which a voltage is not output from the second transistor 14, it is not input to the base terminal 15b so that the first transistor 15 is not brought into the conduction state.

In this case, the collector terminal 15c and the emitter terminal 15e in the first transistor 15 are not brought into the conduction state and the collector terminal 15c of the first transistor 15 is not grounded. Consequently, a control voltage can be input to the control terminal 1g of the power FET 1 and the power FET 1 can be brought into the conduction state.

The first transistor 15 is equivalent to a first switching unit for controlling the operation of the power FET 1.

The second transistor 14 controls the operation of the first transistor 15. More specifically, the second transistor 14 brings the first transistor 15 into the conduction or non-conduction state depending on the conduction state thereof.

The second transistor 14 includes a base terminal 14b, an emitter terminal 14e and the collector terminal 14c. The base terminal 14b of the second transistor 14 is connected to the terminal 6 of the third coil L3 through a resistor 20 and a diode 21 which are connected in series. The resistor 20 is a base resistor for the second transistor 14. By the resistor 20, a current for bringing the second transistor 14 into the conduction state is adjusted.

The collector terminal 14c of the second transistor 14 is connected to the base terminal 15b of the transistor 15 through the resistor 18. The emitter terminal 14e of the second transistor 14 is connected to the terminal 4 of the second coil L2 through the Zener diode 13 and the diode 9.

In the second transistor 14, a voltage having a constant level which is smoothened by the diode 21 and the second integrating circuit 32 which will be described below is input to the base terminal 14b. When a voltage having a constant voltage value or more is input from the Zener diode 13 to be described below to the emitter terminal 14e, moreover, the second transistor 14 is brought into the conduction state depending on a potential difference between the base terminal 14b and the emitter terminal 14e.

When the second transistor 14 is brought into the conduction state, the voltage input from the emitter terminal 14e is output from the collector terminal 14c and is input to the base terminal 15b of the first transistor 15.

The second transistor 14 is equivalent to a second switching unit for controlling the operation of the first transistor 15.

The power circuit 35 is provided with the first integrating circuit 31. The first integrating circuit 31 integrates the pulse voltage induced to the second coil L2 to obtain a smoothened voltage. The first integrating circuit 31 is constituted by the capacitor 11 and the resistor 12 which are connected in parallel.

Each of the capacitor 11 and the resistor 12 which constitute the first integrating circuit 31 has one of terminals connected to the terminal 4 of the second coil L2 through the diode 9 and has the other terminal grounded.

More specifically, as shown in FIG. 1, the terminal 4 of the second coil L2 is connected to the anode side of the diode 9, and one of the terminals of each of the capacitor 11 and the resistor 12 is connected to the cathode side of the diode 9.

A portion of the voltage induced to the terminal 4 of the second coil L2 which takes a positive potential input to the first integrating circuit 31 through the diode 9 is integrated by the first integrating circuit 31 and is changed to be a smoothened voltage. The voltage smoothened by the first integrating circuit 31 is applied in an opposite direction to the Zener diode 13 which will be described below, that is, to the cathode side.

Moreover, the power circuit 35 is provided with the second integrating circuit 32. The second integrating circuit 32 integrates a pulse voltage induced to the third coil L3 to obtain a smoothened voltage. The second integrating circuit 32 is constituted by a capacitor 22 and a resistor 23 which are connected in parallel.

Each of the capacitor 22 and the resistor 23 which constitute the second integrating circuit 32 has one of terminals connected to the terminal 6 of the third coil L3 through the diode 21 and has the other terminal grounded.

More specifically, as shown in FIG. 1, the terminal 6 of the third coil L3 is connected to the anode side of the diode 21, and one of the terminals of each of the capacitor 22 and the resistor 23 is connected to the cathode side of the diode 21.

A portion of the voltage induced to the terminal 6 of the third coil L3 which takes a positive potential input to the second integrating circuit 32 through the diode 21 is integrated by the second integrating circuit 32 and is changed to be a smoothened voltage. The voltage smoothened by the second integrating circuit 32 is applied in a forward direction with respect to the Zener diode 13 which will be described below, that is, to the anode side through the second transistor 14.

The Zener diode 13 detects the abnormality of the state of a voltage between the terminal 4 of the second coil L2 and the terminal 6 of the third coil L3. The Zener diode 13 is equivalent to abnormality detecting means for detecting the abnormality of the state of the voltage between the second coil L2 and the third coil L3.

The Zener diode 13 has a cathode side connected to the cathode side of the diode 9 and one of-the terminals of the first integrating circuit 31, and an anode side connected to the emitter terminal 14e of the second transistor 14.

More specifically, the Zener diode 13 is connected in an opposite direction to the terminal 4 of the second coil L2 and in a forward direction to the terminal 6 of the third coil L3.

In the power circuit 35, a breakdown voltage Vtz in the opposite direction to the Zener diode 13, a voltage output from the first integrating circuit 31 and a voltage output from the second integrating circuit 32 are regulated to satisfy the following relationship.

More specifically, a voltage to be applied in the opposite direction to the Zener diode 13 is regulated to be lower than the breakdown voltage Vtz in the opposite direction when the power circuit 35 is normally operated, and to be higher than the breakdown voltage Vtz in the opposite direction when an abnormality is caused on the secondary side of the power circuit 35.

More detailed description will be given. Based on a difference between an output $V_{N1}$ of the first integrating circuit 31 and an output $V_{N2}$ of the second integrating circuit 32 which is made when a short circuit is not caused on the secondary side of the transformer 25 but the power circuit 35 is operated normally, the breakdown voltage Vtz in the opposite direction to the Zener diode 13 is regulated to be higher than the voltage to be applied in the opposite direction to the Zener diode 13.

Based on a difference between an output $V_{AB1}$ of the first integrating circuit 31 and an output $V_{AB2}$ of the second integrating circuit 32 which is made when the short circuit is caused on the secondary side of the transformer 25 and the power circuit 35 is not operated normally, the breakdown voltage Vtz in the opposite direction to the Zener diode 13 is regulated to be lower than the voltage to be applied in the opposite direction to the Zener diode 13.

When the short circuit is caused on the secondary side of the transformer 25 and the state of the voltage between the second coil L2 and the third coil L3 on the primary side of the transformer 25 is changed, consequently, conduction is generated in the opposite direction to the Zener diode 13.

Thus, it is possible to detect that the short circuit is caused on the secondary side of the transformer 25 and the abnormality is generated in the power circuit 35. When the Zener diode 13 is conducted in the opposite direction, a voltage is output from the Zener diode 13 to the second transistor 14 so that the second transistor 14 is brought into a conduction state.

Specific examples of the voltages Vtz, $V_{N1}$, $V_{N2}$, $V_{AB1}$ and $V_{AB2}$ will be given. It is possible to set Vtz=8.2V, $V_{N1}$=15V, $V_{N2}$=10V, $V_{AB1}$=16V and $V_{AB2}$=5V, for example.

Next, an example of the operation of the power circuit 35 will be described. First of all, description will be given to the case in which the power circuit 35 is operated normally. When a pulse voltage is applied to the first coil L1 of the transformer 25, voltages in accordance with the relationship among the numbers of winds of the coils L1, L4 and L5 are induced to the coils L4 and L5, respectively. Moreover, voltages in accordance with the relationship among the numbers of winds of the coils L2, L3 and L5 are induced to the coils L2 and L3, respectively.

The voltage of the coil L2 is input from the output terminal 4 to the gate terminal 1g of the power FET 1 through the resistor 7 and the capacitor 8. Consequently, the power FET 1 is brought into the conduction state so that a current can be caused to flow to each of the coils of the transformer 25 and a power can be supplied to the transformer 25.

Figure 2:
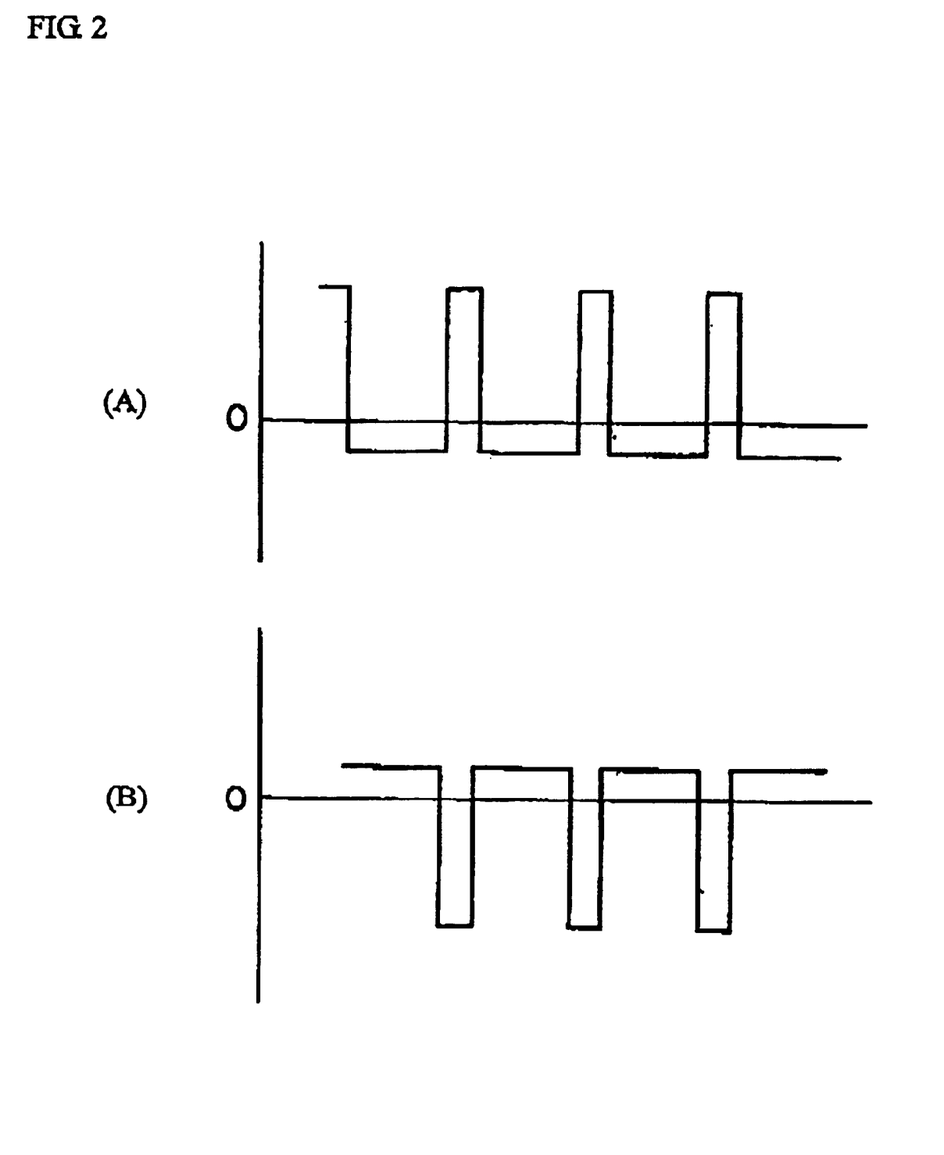
FIG. 2 is a diagram showing the waveform of a voltage on the primary side of the transformer of the power circuit, FIG. 2A showing the waveform of the voltage of a second coil on the primary side of the transformer and FIG. 2B showing the waveform of the voltage of a third coil on the primary side of the transformer.

FIG. 2 shows the waveforms of the pulse voltages of the coils L2 and L3 which are obtained when a power is normally supplied to the transformer 25. In FIG. 2, an axis of abscissa indicates a time and an axis of ordinate indicates a voltage value. Moreover, an electric potential is zero on the axis of abscissa, and the electric potential is positive on the upper side of the axis of abscissa and is negative on the lower side of the axis of abscissa.

The waveform shown in FIG. 2A represents a change in the electric potential of the terminal 4 of the coil L2, which is a pulse voltage induced to the coil L2. Moreover, the waveform shown in FIG. 2B represents a change in the electric potential of the terminal 6 of the coil L3, which is a pulse voltage induced to the coil L3.

As shown in FIG. 2, the peak value of the voltage induced to the coil L2 is greater than that of the voltage induced to the coil L3. As shown in FIG. 2, moreover, the pulse voltage induced to the coil L2 and the pulse voltage induced to the coil L3 make a phase difference of 180 degrees.

As shown in. FIG. 2, furthermore, the pulse width of the voltage induced to the coil L2 (the duty of the pulse voltage) is smaller than the pulse width of the voltage induced to the coil L3 (the duty of the pulse voltage).

A portion of the pulse voltage induced to the second coil L2 which has a positive potential is input to the first integrating circuit 31 through the diode 9 and is integrated by the first integrating circuit 31. Moreover, a portion of the pulse voltage induced to the third coil L3 which has a positive potential is input to the second integrating circuit 32 through the diode 21 and is integrated.

Figure 3:
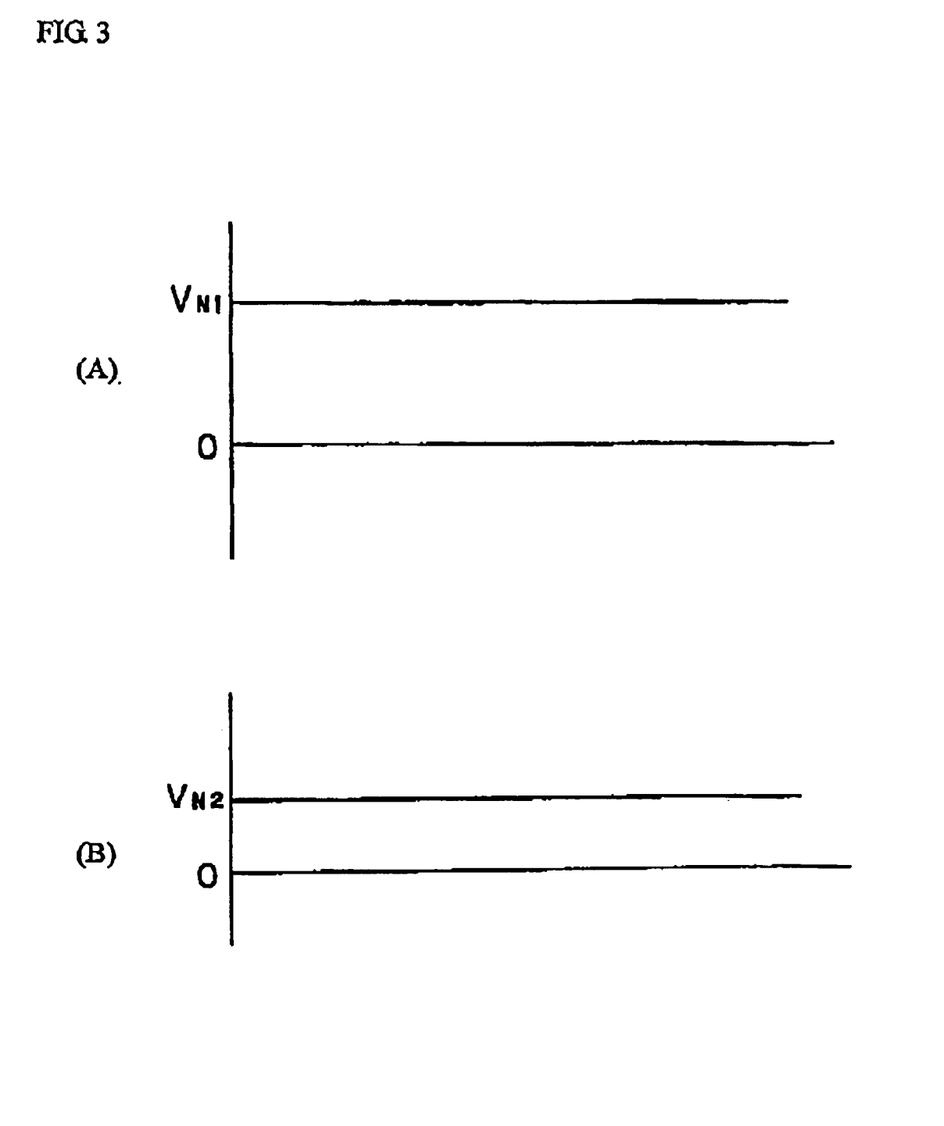
FIG. 3 is a diagram showing the waveform of a voltage integrated by an integrating circuit in a normal operation, FIG. 3A showing a voltage integrated by a first integrating circuit and FIG. 3B showing a voltage integrated by a second integrating circuit.

FIG. 3 shows the voltages obtained by the integration of the first integrating circuit 31 and the second integrating circuit 32. In FIG. 3, an axis of abscissa indicates a time and an axis of ordinate indicates a voltage value. In FIG. 3, moreover, an electric potential is zero on the axis of abscissa, and the electric potential is positive on the upper side of the axis of abscissa. FIG. 3A shows the waveform of a voltage which is obtained after the integration of the first integrating circuit 31 and FIG. 3B shows the waveform of a voltage which is obtained after the integration of the second integrating circuit 32.

As shown in FIG. 3A, the voltage obtained after the integration of the first integrating circuit 31 is changed into a smoothened voltage on a constant level having the voltage value $V_{N1}$. As shown in FIG. 3B, the voltage obtained after the integration of the second integrating circuit 32 is changed into a smoothened voltage on a constant level having the voltage value $V_{N2}$.

A voltage based on a difference between the output $V_{N1}$ of the first integrating circuit 31 and the output $V_{N2}$ of the second integrating circuit 32 is applied in the opposite direction to the Zener diode 13 and is equal to or lower than the breakdown voltage Vtz in the opposite direction to the Zener diode 13, and the Zener diode 13 cannot be conducted in the opposite direction.

Since the Zener diode 13 is not conducted in the opposite direction, the second transistor 14 is not brought into the conduction state. Consequently, the first transistor 15 is not brought into the conduction state so that the conduction state of the power FET 1 is maintained and the supply of a power to the transformer 25 is maintained. Thus, the power circuit 35 is continuously operated normally.

Next, description will be given to the case in which an abnormality is caused on the power circuit 35, that is, a short circuit is generated on the secondary side of the transformer 25. When the short circuit is generated on the secondary side of the transformer 25 in the state in which the power circuit 35 is normally operated as described above, the states of the voltage of the second coil L2 and the third coil L3 on the primary side of the transformer 25 are changed.

Figure 4:
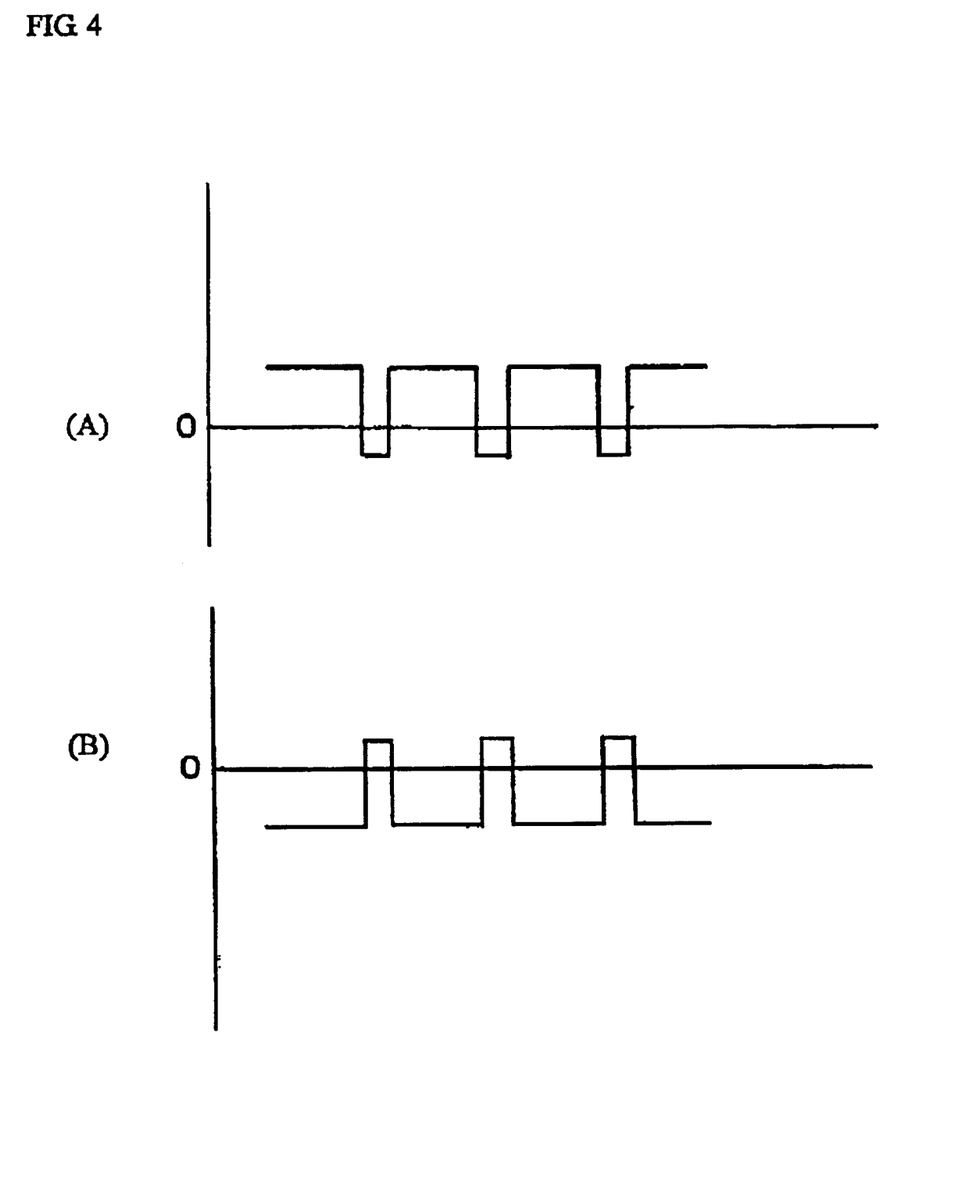
FIG. 4 is a diagram showing a voltage on the primary side of the transformer in the case in which an abnormality is caused on the secondary side of the transformer, FIG. 4A showing the waveform of the voltage of the second coil on the primary side of the transformer and FIG. 4B showing the waveform of the voltage of the third coil on the primary side of the transformer.

FIG. 4 shows the waveforms of the pulse voltages generated on the coils L2 and L3 when a short circuit is caused on the secondary side of the transformer 25. In FIG. 4, an axis of abscissa indicates a time and an axis of ordinate indicates a voltage value. Moreover, an electric potential is zero on the axis of abscissa, and the electric potential is positive on the upper side of the axis of abscissa and is negative on the lower side of the axis of abscissa.

The waveform shown in FIG. 4A represents a change in the electric potential of the terminal 4 of the coil L2, which is a pulse voltage induced to the coil L2. Moreover, the waveform shown in FIG. 4B represents a change in the electric potential of the terminal 6 of the coil L3, which is a pulse voltage induced to the coil L3.

As shown in FIG. 4, the pulse voltage induced to the coil L2 and the pulse voltage induced to the coil L3 make a phase difference of 180 degrees. As shown in FIG. 4, furthermore, the pulse width of the voltage induced to the coil L2 (the duty of the pulse voltage) is greater than the pulse width of the voltage induced to the coil L3 (the duty of the pulse voltage).

Figure 5:
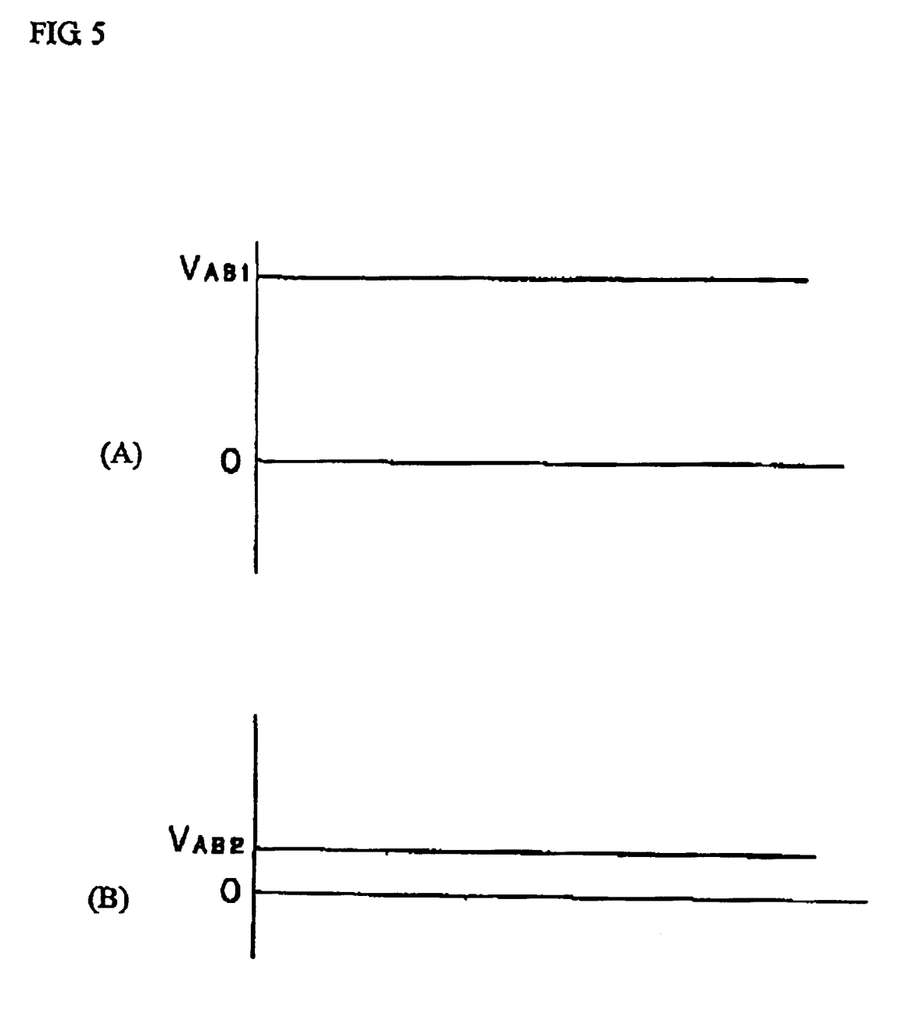
FIG. 5 is a diagram showing the waveform of a voltage integrated by the integrating circuit in the case in which an abnormality is caused, FIG. 5A showing a voltage integrated by the first integrating circuit and FIG. 5B showing a voltage integrated by the second integrating circuit.

The pulse voltage induced to the second coil L2 is integrated by the first integrating circuit 31. Moreover, the pulse voltage induced to the third coil L3 is integrated by the second integrating circuit 32. FIG. 5 shows voltages obtained by the integration of the first integrating circuit 31 and the second integrating circuit 32.

In FIG. 5, an axis of abscissa indicates a time and an axis of ordinate indicates a voltage value. In FIG. 5, moreover, an electric potential is zero on the axis of abscissa, and the electric potential is positive on the upper side of the axis of abscissa. FIG. 5A shows the waveform of a voltage which is obtained after the integration of the first integrating circuit 31 and FIG. 5B shows the waveform of a voltage which is obtained after the integration of the second integrating circuit 32.

As shown in FIG. 5A, the voltage obtained after the integration of the first integrating circuit 31 is changed into a smoothened voltage on a constant level having the voltage value $V_{AB1}$. As shown in FIG. 5B, the voltage obtained after the integration of the second integrating circuit 32 is changed into a smoothened voltage on a constant level having the voltage value $V_{AB2}$.

A voltage based on a difference between the output $V_{AB1}$ of the first integrating circuit 31 and the output $V_{AB2}$ of the second integrating circuit 32 is applied in the opposite direction to the Zener diode 13, and is higher than the breakdown voltage Vtz in the opposite direction to the Zener diode 13. Consequently, the Zener diode 13 can be conducted in the opposite direction.

Thus, the voltage $V_{AB1}$ output from the first integrating circuit 31 and applied in the opposite direction to the Zener diode 13 is applied to the emitter terminal 14e of the transistor 14. Then, the transistor 14 is brought into the conduction state based on the difference between the voltages $V_{AB1}$ and $V_{AB2}$.

The voltage output from the collector terminal 14c of the transistor 14 is input to the base terminal 15b of the transistor 15 so that the transistor 15 is brought into the conduction state. Consequently, the collector terminal 15c and the emitter terminal 15e in the transistor 15 are brought into the conduction state and the collector terminal 15c is connected to the ground.

Thus, the gate terminal 1g is grounded and a control voltage is not input so that the power FET 1 is brought into a non-conduction state. Therefore, a current cannot be given to the coil L1 of the transformer 25 and the power FET 1 and a power cannot be supplied to the transformer 25. As a result, the operation of the power circuit 35 is stopped.

Consequently, it is possible to prevent the power circuit 35 from being continuously operated in a state in which the short circuit is generated on the secondary side of the transformer 25 and to prevent the power circuit 35 from being burned. When the short circuit is generated on the secondary side of the transformer 25, a circuit provided on the primary side of the transformer 25 can detect that the abnormality is generated, thereby stopping the operation of the power circuit 35.

More specifically, the power circuit 35 does not need to comprise, on the secondary side, means for detecting that the abnormality is generated on the secondary side of the transformer 25. According to the power circuit 35, therefore, the size of the secondary side of the transformer 25 is decreased. Thus, it is possible to reduce a space for providing the power circuit 35.

According to the power circuit 35, moreover, the size of the secondary side of the transformer 25 is decreased. Therefore, an electric apparatus can easily be connected to the secondary side of the transformer 25 and the power circuit 35 can readily be handled.

In the above description, the power FET is used as the power switching unit 1. In order to carry out the present invention, it is also possible to use, as the power switching unit 1, a unit other than the power FET.

More specifically, it is sufficient that the power switching unit 1 is a switching unit which includes a control terminal, an input terminal and an output terminal, can input a current from the input terminal and can output the same current from the output terminal when a control voltage is input to the control terminal to bring a conduction state, and can input/output a large power. For example, it is also possible to use a power transistor as a power switching unit other than the power FET.

While an NPN transistor is used as the first switching unit 15 in the above description, moreover, a PNP transistor can also be used as the first switching unit 15.

Furthermore, it is also possible to use, as the first switching unit 15, a semiconductor switching unit other than a transistor. More specifically, it is sufficient that the first switching unit 15 is a switching unit which includes a terminal for inputting, as an operation signal, a voltage output from the second switching unit 14, a terminal to be connected to the output terminal of the power switching unit 1 and a terminal to be connected to the ground, and is brought into a conduction state by the input of the voltage from the second switching unit 14 and can thus conduct the output terminal of the power switching unit 1 to the ground.

While a PNP transistor is used as the second switching unit 14 in the above description, moreover, an NPN transistor can also be used as the second switching unit 14.

Furthermore, it is also possible to use, as the second switching unit 14, a semiconductor switching unit other than a transistor. More specifically, it is sufficient that the second switching unit 14 is a switching unit which includes a terminal for inputting a voltage output from the Zener diode 13, a terminal for inputting a voltage output from the second integrating circuit 32 and a terminal for outputting a voltage to the first switching unit 15, and is brought into a conduction state based on a difference between the voltage output from the abnormality detecting means 13 and the voltage output from the second integrating circuit 32, thereby controlling the first switching unit 15 to be brought into the conduction state.

Moreover, there has been described the example in which the Zener diode is provided as the abnormality detecting means 13. It is sufficient that the abnormality detecting means 13 can detect the abnormality of the state of the voltage between the second coil L2 and the third coil L3 based on a predetermined set value in place of the Zener diode. It is sufficient that the second switching unit 14 can be brought into the conduction state and the first switching unit 15 can be thus brought into the conduction state when the abnormality of the voltage is detected by the abnormality detecting means 13.

Furthermore, there has been described the example in which the second switching unit 14 is brought into the conduction state and the first switching unit 15 is thus brought into the conduction state when the abnormality detecting means 13 detects an abnormality. In order to carry out the present invention, it is not necessary to always provide the second switching unit 14. More specifically, the second switching unit 14 is not provided but the first switching unit 15 may be brought into the conduction state by the detection of an abnormality through the abnormality detecting means 13.

As described above, according to the power circuit of the present invention, the means for detecting an abnormality generated on the secondary side of the transformer is provided on the primary side of the transformer and the size of the secondary side of the transformer is reduced.

According to the power circuit of the present invention, consequently, it is possible to produce an advantage that a space for providing the power circuit can be reduced. Moreover, it is also possible to produce an advantage that an electric apparatus can easily be connected to the power circuit and the power circuit can readily be handled.

What is claimed is:

1. A power circuit comprising a transformer,
   wherein a first coil, a second coil and a third coil are provided on a primary side of the transformer, a pulse voltage is applied to the first coil from a power source for outputting a power based on the pulse voltage, each of the second and third coils has one of terminals grounded in common and directions in which the coils are to be wound toward the other terminals are opposite to each other and the numbers of winds of the second and third coils are different from each other,
   a plurality of coils corresponding to the first, second and third coils on the primary side are provided on a secondary side of the transformer,
   a primary side of the transformer is provided with a power switching unit connected in series to the first coil and serving to control an input of a power to the transformer, a first integrating circuit for integrating a voltage output through a diode connected to the other terminal of the second coil in a forward direction, a second integrating circuit for integrating a voltage output through a diode connected to the other terminal of the third coil in a forward direction, and abnormality detecting means for detecting an abnormality of a state of a voltage between the second coil and the third coil based on an output of the first integrating circuit, an output of the second integrating circuit and a predetermined set value,
   a pulse voltage is applied to the first coil so that a power is input to the transformer when the power switching unit is brought into a conduction state, and
   the power switching unit is brought into a non-conduction state so that the input of the power to the transformer is stopped when the abnormality detecting means detects the abnormality of the state of the voltage between the second coil and the third coil.

2. The power circuit according to claim 1, wherein a first switching unit for controlling an operation of the power switching unit is provided on the primary side of the transformer,
   the power switching unit has an input terminal for inputting a current and an output terminal for outputting the current which are connected in series to the first coil, and a control terminal for controlling a conduction state and a non-conduction state which is connected to input a control voltage from the other terminal of the second coil and is connected to a ground through the first switching unit, and
   the first switching unit is brought into the conduction state when the abnormality detecting means detects the abnormality, the control terminal of the power switching unit is grounded by the first switching unit set in the conduction state, and the power switching unit is thus brought into the non-conduction state.

3. The power circuit according to claim 2, wherein a Zener diode is provided as the abnormality detecting means, the Zener diode is conducted in an opposite direction when an abnormality is generated on the state of the voltage between the second coil and the third coil, and the Zener diode conducted in the opposite direction outputs a voltage, thereby bringing the first switching unit into the conduction state.

4. The power circuit according to claim 3, wherein the primary side of the transformer is provided with a second switching unit for controlling the conduction state of the first switching unit,
   the second switching unit is connected to be brought into the conduction state when the Zener diode detects the abnormality of the state of the voltage between the second coil and the third coil, thereby outputting a voltage, and
   the first switching unit is brought into the conduction state by the second switching unit set in the conduction state.

5. The power circuit according to claim 1, wherein the first switching unit is a transistor.

6. The power circuit according to claim 4, wherein the second switching unit is a transistor.

7. The power circuit according to claim 2, wherein the first switching unit is a transistor.

8. The power circuit according to claim 3, wherein the first switching unit is a transistor.

9. The power circuit according to claim 4, wherein the first switching unit is a transistor.

10. The power circuit according to claim 5, wherein the second switching unit is a transistor.

11. The power circuit according to claim 7, wherein the second switching unit is a transistor.

12. The power circuit according to claim 8, wherein the second switching unit is a transistor.

13. The power circuit according to claim 9, wherein the second switching unit is a transistor.

* * * * *